Figure 1:
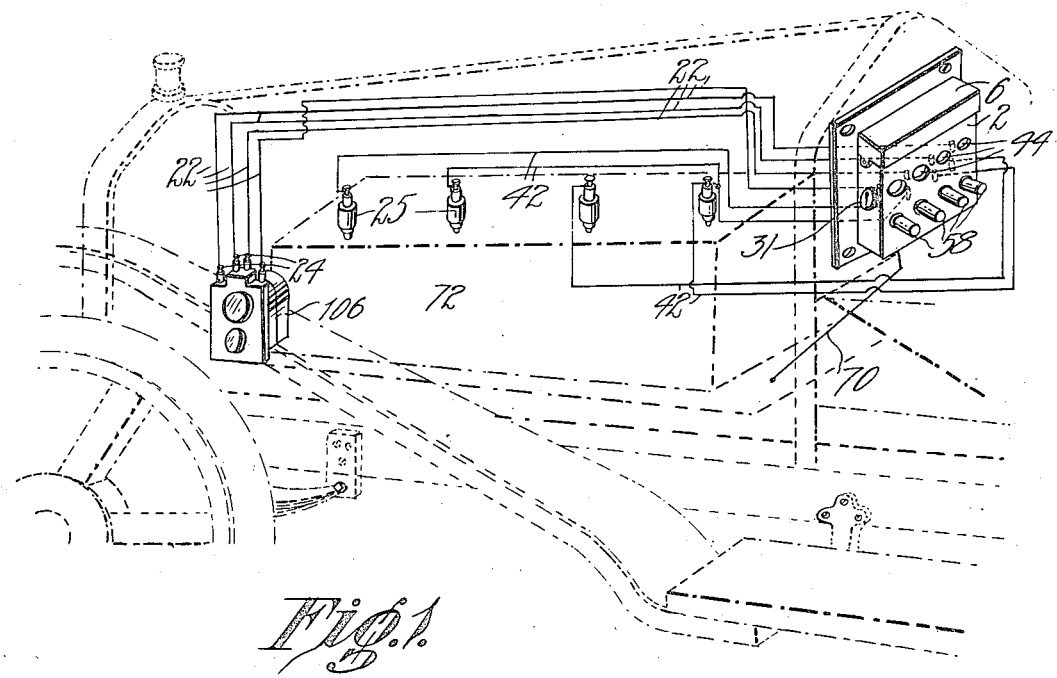

E. H. SCOTT.
APPARATUS FOR INDICATING AND LOCATING DEFECTS IN THE IGNITION VALVE AND CARBURETER SYSTEMS OF INTERNAL COMBUSTION ENGINES.
APPLICATION FILED NOV. 18, 1914.

1,193,621.

Patented Aug. 8, 1916.
2 SHEETS—SHEET 1.

E. H. SCOTT.
APPARATUS FOR INDICATING AND LOCATING DEFECTS IN THE IGNITION VALVE AND CARBURETER SYSTEMS OF INTERNAL COMBUSTION ENGINES.
APPLICATION FILED NOV. 18, 1914.
1,193,621.
Patented Aug. 8, 1916.
2 SHEETS—SHEET 2.
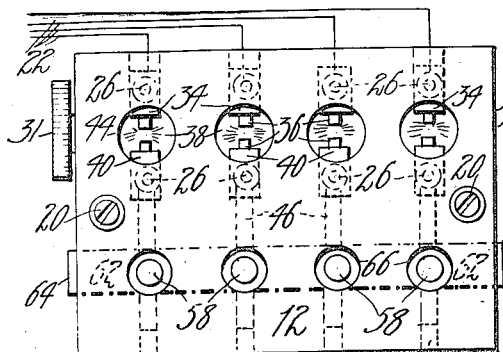
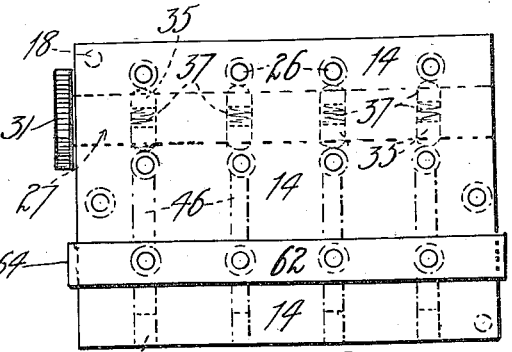
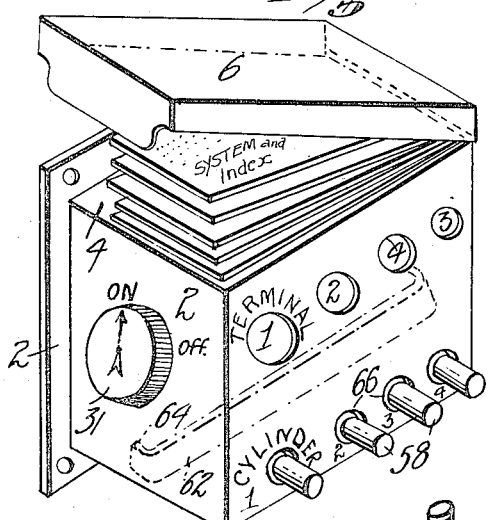
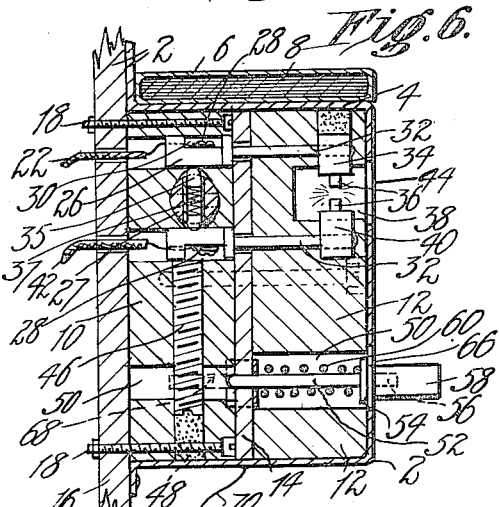
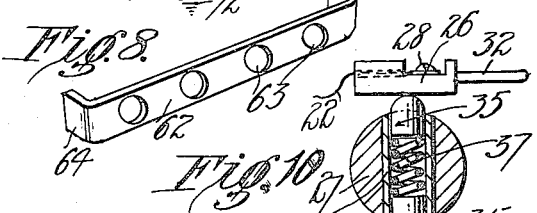
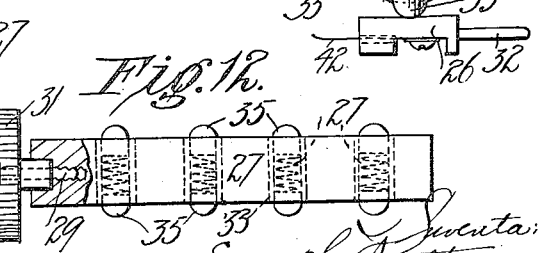

UNITED STATES PATENT OFFICE.

ERNEST HUMPHREY SCOTT, OF MALVERN, NEAR MELBOURNE, VICTORIA, AUSTRALIA.

APPARATUS FOR INDICATING AND LOCATING DEFECTS IN THE IGNITION, VALVE AND CARBURETER SYSTEMS OF INTERNAL-COMBUSTION ENGINES.

1,193,621.     Specification of Letters Patent.     Patented Aug. 8, 1916.

Application filed November 18, 1914. Serial No. 872,849.

*To all whom it may concern:*

Be it known that I, ERNEST HUMPHREY SCOTT, a subject of the King of Great Britain, residing at "Wombalano," Toorak Road, Malvern, near Melbourne, in the State of Victoria and Commonwealth of Australia, have invented an Apparatus for Indicating and Locating Defects in the Ignition, Valve and Carbureter Systems of Internal-Combustion Engines, of which the following is a specification, reference being had therein to the accompanying drawings.

This invention relates to an electrical apparatus for rapidly locating and indicating defects in the ignition, valve and carbureter systems, and its connections, of internal combustion engines and is specially applicable to the engines of motor car and other self-propelled vehicles.

Various devices have hitherto been employed for testing sparking plugs, the usual method being to short circuit all the plugs, except one, and testing each in turn until the defective plug is found, but according to this invention all possible defects in the ignition, valve and carbureter systems may be rapidly located and indicated.

This invention has been devised in order to overcome the loss of time and general inconvenience that is at present occasioned by defective ignition, valve and carbureter systems and to provide a cheap simple and effective apparatus whereby faults which occur in the magneto and wiring, defects in the valves, spark plugs and the carbureters and its connections and which cause misfiring or stoppage of the engine may be readily ascertained and located.

An essential feature of the invention consists of an indicator containing an index whereby the parts at fault may be located on reference to the directions embodied therein and then corrected, and which are divided into various sections so that the attendant when trouble occurs, can readily locate the defect by referring to the particular section or sub-section that has been indicated to be at fault.

According to this invention the indicator above mentioned is combined with the magneto wiring system and is arranged in the line wires of the ignition circuit between the magneto and the spark plugs, being preferably fitted to the dash board of the vehicle adjacent to the driver. Terminals are arranged within the indicator and are separated to form a spark gap in each line wire from the respective magneto terminal to the spark plug being so arranged that in a four cylinder engine four spark gaps would be visible to the driver and should the magneto be working satisfactorily, a continuous sparking would emanate from the spark gaps within the indicator.

A further essential feature comprises a switch arranged and operating in the indicator and locator whereby the current in each line wire may be cut out from the spark gaps above described and deflected direct to the sparking plugs. This would preferably be the normal arrangement and for the purpose of testing the magneto the switch can be readily cut out and the current would then pass over the spark gaps visible to the driver. By this arrangement the oxidization of the points of the spark gaps is obviated and a much wider spark gap may be used than has hitherto been possible the wide spark gap causing a better spark at the plug points which is of material assistance in clearing the points when they become oiled up.

The essence of this invention consists in combining the indicator and locator carrying the switch above described with testing mechanism whereby all possible defects in the magneto and wiring, valves, spark plugs, carbureter, and its connections can be detected and located.

The testing mechanism consists in the arrangement within the indicator of electrical make and break devices, preferably push buttons or their equivalent, the number of push buttons being limited to the number of spark gaps in the indicator and consequently to the number of cylinders in the engine. These push buttons are arranged in a subsidiary circuit arranged normally adjacent to and air-gapped from the magneto circuit the subsidiary circuit passing through the indicator casing and is earthed to the engine frame. The ignition circuit is so arranged that the current is normally flowing through the switch above described from the magneto to the spark plugs, and the magneto can be readily tested by cutting out the switch. Faults in the spark plugs, valves, and carbureter and its connections are located by pressing in a press button or buttons, and it or they make electrical connection in the particular line circuit or circuits and the current in those lines so controlled taking the path of least resistance flows from the terminals of the magneto, not to the spark plugs, but to the engine frame, and in this way the particular cylinder or cylinders at fault is or are readily detected as the engine stops altogether in the case of valve or spark plug troubles when all but defective cylinder or cylinders are cut out and those cylinders indicated by the press button or buttons not pressed in, are at fault.

If on testing each cylinder in turn they appeared correct, yet engine misfired when car was running along the road, it would prove that the misfiring was irregular and therefore that the trouble exists in the carbureter or its connections and the index shows which connection or parts of the carbureter is or are at fault. By cutting out the switch plug and allowing the current to pass over the spark gaps and by means of the testing buttons, many and various defects are indicated and with the aid of a special index are quickly located as follows:—If one spark is not showing the trouble would be either the corresponding terminal in magneto pulled out, or a short circuit in the high tension cable, reference to the index showing the part to examine. Should the sparks appear irregularly, the trouble would be either a defective switch wire, contact breaker, or high tension collecting brush, reference to the index showing which part to examine and also how to remedy the defect. If however, all sparks appeared regularly, it would show that the magneto and its connections were correct, and the engine would then be tested by means of the testing buttons by pressing in, in the case of a four cylinder engine, three buttons at a time, leaving out one button, so testing one cylinder at a time. If the engine stopped with any one button out of normal the trouble would be either a defective spark plug, or defective valves in that particular cylinder and reference to the index would show which spark plug or valve to examine and also how to remedy the defect. If on testing each cylinder in turn they appeared correct, yet engine mis-fired when car was running along the road, it would prove that the misfiring was irregular and therefore that the trouble exists in the carbureter or its connections, and the index shows which connection or parts of the carbureter is or are at fault and also how to remedy the defect. In this manner by observing the behavior of the spark gaps, and testing engine with the testing buttons all possible defects in the magneto or its connections, spark plugs, valves, carbureter and its connections are rapidly indicated, and by means of the special index incorporated with the indicator, the defects are quickly located.

In order that the invention may be more readily understood it will now be described with reference to the accompanying drawings in which:—

Figure 2:
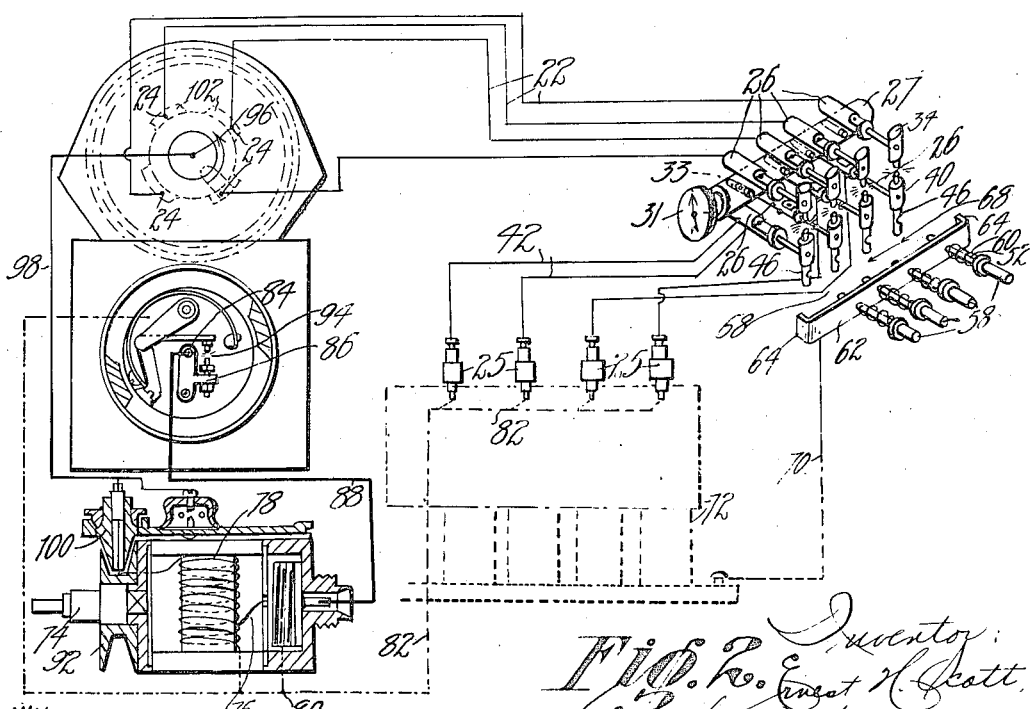

Figure 1 is a view in perspective of the invention applied to the engine of a motor car. Fig. 2 is a diagrammatic view of the ignition circuit illustrating the improvements incorporated therewith. Fig. 3 is a view in front elevation of the indicator and locator with its casing removed. Fig. 4 is a front elevation of the indicator with the front portion removed. Fig. 5 is a view in perspective of the improved indicator and locator embodied in this invention, and Fig. 6 is a vertical section thereof while Figs. 7 and 8 are views in perspective of essential details. Fig. 9 is a sectional view illustrating the switch embodied in this invention. Fig. 10 is a cross sectional view of the said switch and the terminal pins in engagement therewith. Fig. 11 is a perspective view of an essential detail and Fig. 12 is a sectional elevation of the switch.

Like reference numerals indicate the same or corresponding parts in all the figures.

The invention consists of an indicating and locating device comprising a box or casing 2 the upper surface or sides of which is fitted or formed with a shallow compartment 4 closed by a hinged door 6 and within which compartment is arranged a number of hinged leaves or sheets 8 containing an index which is divided into sections and sub-sections for the purpose of providing directions for locating and remedying defects in the engine.

Within the casing is arranged two insulator blocks 10, 12, of vulcanite or other material separated from each other by a rubber strip 14 and fastened to the dashboard 16 or other support to which the casing 2 is fitted, the rubber strip 14 being used to compensate for any irregularity of surface. The inner insulating block 10 is fitted to the dashboard 16 by the bolts 18 while the outer insulating block 12 is detachably fitted to the inner block 10 by the bolts 20.

Where a four cylinder engine is employed four line wires 22 extend from the magneto terminals 24 to the respective spark plugs 25 and according to this invention each of these line wires 22 from the magneto terminals 24 extend to a terminal pin 26 being attached thereto by a screw 28 in a recessed portion 30 of the pin 26. The terminal pins 26 extend longitudinally in recesses formed in the insulating blocks 10, 12 and in line with each other, the projecting pins 32 of each terminal 26 passing through and engaging a plug 34 in the front insulating block 12. These plugs 34 are arranged in line with each other and the points 36 thereof extend into recesses 38 formed in the front insulator block 12, and terminate adjacent to the point 36 of a corresponding plug 40 on each line 42 leading to the spark plugs 25, and a spark gap is therefore provided in each line wire which is visible to the driver, the casing 2 being formed with holes 44 to accomplish this object.

In order that the current in each line wire may flow direct to the sparking plugs 25 the insulator block 10 between each row of terminal pins 26 is formed with a recess to receive a switch plug 27 the outer end of which has threaded thereto the pin 29 of a milled nut 31 by means of which the plug 27 is partially rotated in its socket in the insulator block 10. This plug 27 is formed of insulation material and in line with the terminal pins 26 is slotted to receive metal tubes 33 of conductive material such as brass. Within each tube 33 is arranged oppositely projecting sliding contact points 35 separated by a helical spring 37 arranged to exert an outward pressure on the contact points 35 so that when the switch plug 27 is arranged in its normal position the points 35 contact with the respective terminal pins 26 of each respective line circuit 22, 42 from the magneto to the sparking plugs and the current therefore normally flows from the magneto terminal lines 22 over top terminal pins 26 upper contact points 35 springs 37 lower contact points 35 lower terminal pins 26 along line wires 42 to sparking plugs 25, the spark gaps between the points 36 being cut out.

In order that the magneto may be tested in the manner above described, the contact points 35 of the plug 27 are freed from engagement with the terminal pins 26, which operation is accomplished by partially turning the switch plug 27 in its socket to allow the current to flow over the spark gaps.

Below and in contact with the lower set of terminals 26 connecting the lower set of plugs 40 are vertically arranged a corresponding number of screw plugs 46 which are insulated by the packing 48 from the casing 2. These plugs 46 project within recesses formed vertically in the underside of the insulator block 10. Leading to these latter plugs 46 are horizontal recesses 50 formed in the insulating blocks 10, 12, which receive push buttons. Each of these push buttons is provided with a contact point or pin 52 one end of which is formed with a flange 54 and an extension 56 threaded within the ebonite button 58, while a helical spring 60 is adapted to bear against the flange 54 within the recess 50 formed in the outer block 12, the spring 60 also bearing against a slotted metal strip or contact plate 62 arranged between the insulating blocks 10, 12 and each end thereof is bent at 64 the bent portions being in frictional contact with the casing 2.

The buttons 58 pass outside the casing 2 through holes 66 and the circuit is so arranged that on pressing in a button against the tension of its spring 60 the pin 52 thereof passes through the holes 63 in the plate 62 and makes electrical contact with the screw plug 46 the gap 68 between the subsidiary circuit 70 being thereby bridged in front of that particular line wire 42 leading to the spark plug 25 and the current taking the path of least resistance passes from the magneto terminal 24 along line 22 over upper terminal pin 26 contact points 35 lower terminal pin 26 plugs 46 contact plate 62 indicator casing 2, which is in frictional contact with the ends 64 of the plate 62, along line wire 70 comprising the subsidiary circuit which connects the casing 2 to earth or engine frame 72, so cutting out the circuit to the particular cylinder or cylinders according to the particular button or buttons pressed in. When the button is released the subsidiary circuit is automatically opened or broken by the action of the spring 60 and the spark plug circuit is automatically closed or made the current then flowing from the magneto terminals 24 along lines 22 upper terminal pins 26 contact points 35 lower terminal pins 26 and along line wires 42 to the respective spark plugs 25, and in this case the earth line 70 and testing mechanism is cut out.

The complete circuits embodied in this invention are illustrated on Fig. 2 and are applied to a four cylinder engine with high tension magneto system, and will now be described when the apparatus is in its normal position and for testing the whole of the mechanism except the magneto.

As ordinarily the armature 74 carries the windings, the primary being indicated at 76 and the secondary at 78. One end 80 of the primary is grounded to the earth wire 82 while the other is joined to the fixed contact screw 84 of the contact breaker 86 by the wire 88. This end is also joined to one end of the secondary winding and the free end of the secondary winding is attached to the collector ring 90 carried by the ebonite spool 92. When the contact points 94 separate a current is induced in the primary and secondary windings and is delivered to the central terminal 96 by the wire 98 from the carbon brush 100 which bears against the collector ring 90.

The various segments 102 of the distributer 104 are connected through the terminals 24 of the magneto 106 to their respective spark plugs 25 by the line wires 22 over terminal pin 26 plug 27 lower terminal pin 26 line 42 to spark plug 25 along earth line wires 82 to engine frame 72.

When the engine is being tested the air gap 68 is bridged owing to the pin 52 engaging with the screw plug 40 and the current to the respective spark plugs taking the path of least resistance is deflected to the earth line 70 so cutting out the circuit from the particular spark plugs 25 in the manner above described. For testing the magneto however the switch plug 27 is cut out and the current flows over the spark gaps visible to the driver.

I desire it to be understood that the invention can readily be adapted to an internal combustion engine fitted with low tension magneto and separate high tension coils.

What I claim as my invention and desire to secure by Letters Patent is:—

1. In a device of the character described, in combination, a casing, insulating supporting blocks within said casing, a switch plug in one of said blocks, means for rotating said plug, terminal pins extending into recesses of the insulating blocks, line wires attached to said pins and leading to the magneto and spark plugs of the engine, plugs in the other of said blocks adapted to be engaged by said pins and extending with their points into recesses of said last named block, spark gaps in each line wire visible to the driver and adapted to be cut into the circuit upon the rotation of said switch plug for testing the magneto, substantially as described.

2. In a device of the character described, comprising a casing, insulated supporting blocks within said casing, and terminal pins connecting the line wires from the magneto terminals and connecting plugs the points of which are air gapped from the points of a corresponding set of plugs engaging terminals connecting the line wires to the spark plugs, a switch plug for bridging the gap between each pair of terminal pins and for normally leading the current direct to the spark plugs, the lower set of terminals being in contact with another set of plugs, press buttons or equivalent switch mechanism arranged within the insulator blocks and normally spaced from the latter plugs, the press buttons being provided with return springs and arranged whereby the pressing in of the buttons causes air spaces to be bridged and contact to be made by the buttons with the lower set of plugs in order to deflect the current from the spark plug lines through a contact plate in frictional contact with the indicator casing to an earth wire leading to the engine frame as and for the purposes specified.

3. In a device of the character described, in combination, a casing, recessed insulating blocks within said casing, vertical screw plugs projecting into recesses of said blocks, spring-controlled push buttons within the horizontal recesses in said blocks, contact points on said buttons, air spaces between the points of said buttons and the plugs, and connection between said plugs and the spark plugs so arranged that upon the pressing of one of said buttons the spark plugs are short circuited and rendered inoperative.

4. In a device of the character described, in combination, a casing, insulating supporting blocks within said casing, a switch plug in one of said blocks, means for rotating said plug, terminal pins extending into recesses of the insulating blocks, line wires attached to said pins and leading to the magneto and spark plugs of the engine, plugs in the other of said blocks adapted to be engaged by said pins and extending with their points into recesses of said last named block, spark gaps in each line wire visible to the driver, and a switch for cutting out the spark gaps and normally leading the current directly to the spark plugs, substantially as described.

5. In a device of the character described, in combination, a casing, insulating supporting blocks within said casing, a switch plug in one of said blocks, means for rotating said plug, terminal pins extending into the recesses of the insulating blocks, line wires attached to said pins and leading to the magneto and the spark plugs of the engine, plugs in the other of said blocks adapted to be engaged by said pins and extending with their points into the recesses of said last named block, spark gaps in each line wire visible to the driver, said switch plug adapted to short circuit said spark gaps, and a set of switches for short circuiting the spark plugs of the engine, substantially as described.

In testimony whereof I affix my signature in presence of two witnesses.

ERNEST HUMPHREY SCOTT.

Witnesses:
WALTER BARNARD,
SIDNEY HENDLEY.